United States Patent
More

[11] Patent Number: 5,243,713
[45] Date of Patent: Sep. 14, 1993

[54] DUAL MODE WATER SAVING FLUSH MECHANISM

[76] Inventor: Robert O. More, 300 N. Tomahawk Dr., Portland, Oreg. 97217

[21] Appl. No.: 785,086

[22] Filed: Oct. 30, 1991

[51] Int. Cl.⁵ .................... E03D 1/14; E03D 5/092
[52] U.S. Cl. .................................... 4/325; 4/414
[58] Field of Search ................ 4/324, 325, 413, 414

[56] References Cited

U.S. PATENT DOCUMENTS

| | | | |
|---|---|---|---|
| 915,636 | 3/1909 | Tilden | 4/414 |
| 1,087,255 | 2/1914 | Payne | 4/414 |
| 1,992,381 | 2/1935 | Lyons | 4/324 |
| 2,001,390 | 5/1935 | Lester | 4/325 |
| 2,526,294 | 10/1950 | Stegeman | 4/325 |
| 2,548,658 | 4/1951 | Duncan | 4/414 |
| 2,702,908 | 3/1955 | Thorndike | 4/325 |
| 2,724,838 | 11/1955 | Wirth et al. | 4/325 |
| 2,744,261 | 5/1956 | Gram | 4/325 |
| 3,141,177 | 7/1964 | Kertell | 4/325 |
| 3,431,564 | 3/1969 | Davies | 4/325 |
| 4,017,912 | 4/1977 | Young, Sr. | 4/324 |
| 4,391,003 | 7/1983 | Talerico et al. | 4/415 |
| 4,411,029 | 10/1983 | Huang | 4/324 |
| 4,485,501 | 12/1984 | Kloner | 4/324 |
| 4,527,296 | 7/1985 | Musgrove | 4/324 |
| 4,651,359 | 3/1987 | Battle | 4/324 |
| 4,881,279 | 11/1989 | Harney | 4/324 |

*Primary Examiner*—Henry J. Recla
*Assistant Examiner*—Robert M. Fetsuga
*Attorney, Agent, or Firm*—Klarquist Sparkman Campbell Leigh & Whinston

[57] ABSTRACT

A toilet flush mechanism including a cam attached to a flush handle and a pivoting arm for controlling a tank release valve. The cam includes a lower portion engaging the lower surface of the arm, and an upper stop for engaging the upper surface of the arm to limit cam rotation and arm elevation. The arm rests on the cam lower portion such that rotation of the handle and cam in a first direction raises the arm by a first amount to contact a first portion of the stop to provide a full flush, and rotation of the handle and cam in a second direction raises the arm by a second amount less than the first amount to contact a second portion of the stop, thereby to provide a limited, water-conserving flush.

3 Claims, 2 Drawing Sheets

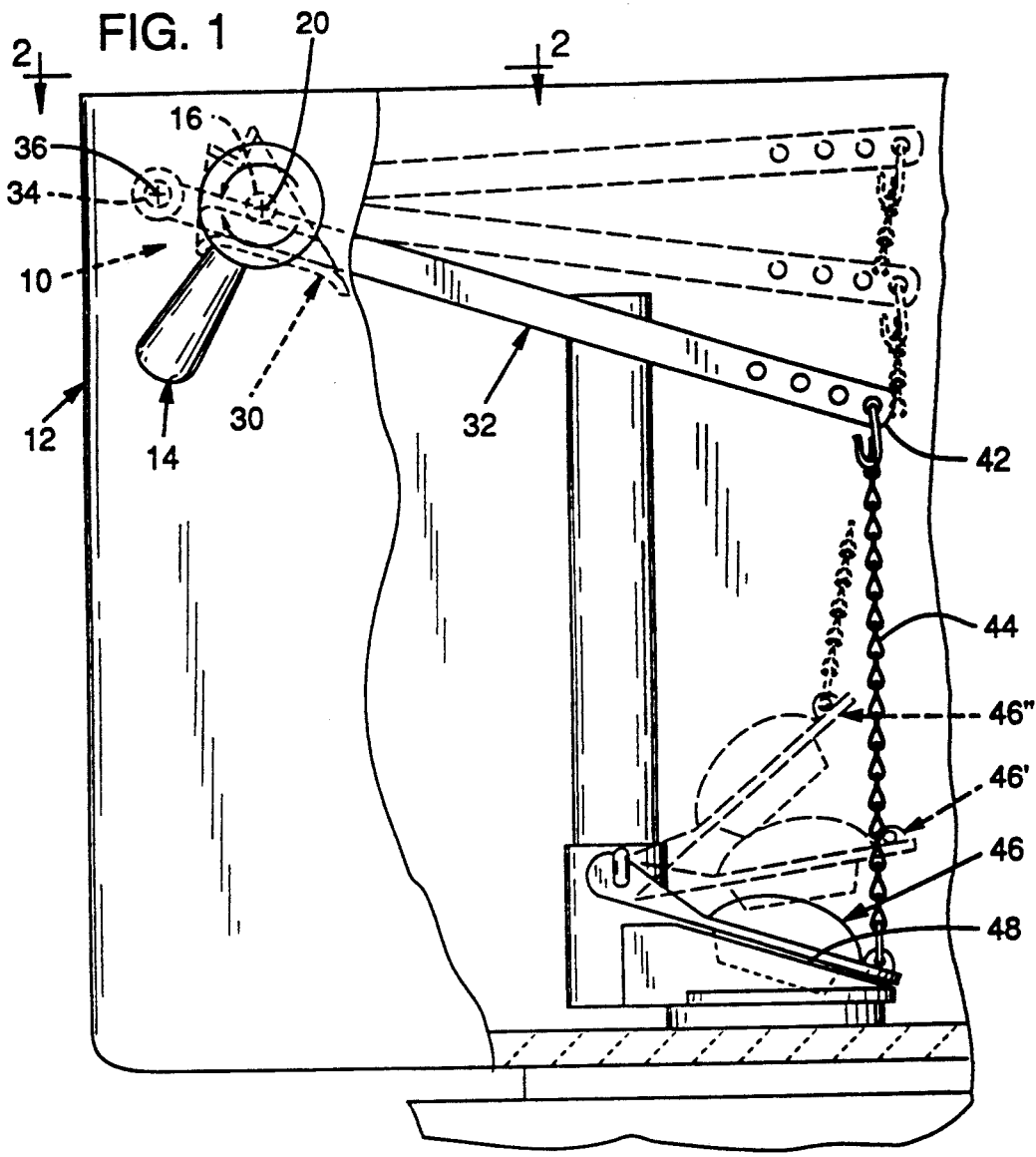

DUAL MODE WATER SAVING FLUSH MECHANISM

TECHNICAL FIELD

This invention relates to an apparatus for conserving water used by flush toilets, and more particularly to an apparatus for providing a full flush when the flush handle is turned in a first direction and a partial flush when the handle is turned in a second direction.

BACKGROUND ART

The need to conserve water is well known, thus there are many inventions directed at conserving unnecessary water use in flush toilets. A typical conservation apparatus uses two flush modes. The first mode completely empties the toilet tank, while the second mode provides a limited release of less than the complete tank volume to conserve water when less flow is required.

U.S. Pat. No. 1,992,381 to Lyons discloses a flushing valve assembly that provides the option of full or partial flushes. Turning a handle in a first direction raises a lever sufficiently to open a flush valve to provide a full flush. Turning the handle in the opposite direction lifts the lever to partially open the valve, the valve closing immediately when the handle is released. A mechanical connection between the handle and the lever is provided by a pair of links that are pivotally attached between the handle and the lever. The complexity of this linkage, which uses a stop screw for setting the handle travel, is undesirable due to the build-up of minerals and corrosion by-products that typically occurs in a flush tank environment. In addition, the complexity of the linkage and number of parts increases manufacturing costs.

Other existing mechanisms are complex and difficult to install. Thus, they are unsuitable for retro-fit installation in existing toilets, especially by untrained do-it-yourself homeowners.

Other dual flush devices utilizing complex mechanisms are shown in the prior art, and have similar disadvantages as the Lyons reference discussed above. Such devices are shown in the following references:

U.S. Pat. No. 4,391,003 to Talerico et al.
U.S. Pat. No. 4,411,029 to Huang
U.S. Pat. No. 4,485,501 to Kloner
U.S. Pat. No. 4,527,296 to Musgrove
U.S. Pat. No. 4,651,359 to Battle

SUMMARY OF INVENTION

It is an object of the present invention to provide a dual mode flush mechanism of simple mechanical construction and few parts.

A further object of the present invention is to provide a flush mechanism which may easily be retro-fit to existing flush tanks.

It is yet another object of the invention to provide a flush mechanism that may be easily and inexpensively manufactured from inexpensive materials.

The invention achieves these and other objects by providing an apparatus having a cam attached to a flush handle for actuating an arm connected to a tank release valve. The cam has an arm-actuating surface for moving the arm by a first amount when the handle is turned in a first direction, and for moving the arm by a second amount greater than the first amount when the handle is turned in a second direction.

BRIEF DESCRIPTION OF THE DRAWINGS

FIG. 1 is a front view of an apparatus constructed in accordance with the invention illustrating its various stages of operation.

FIG. 2 is an enlarged top view of a portion of the apparatus of FIG. 1, as viewed along line 2—2 and turned 180°.

DETAILED DESCRIPTION OF A PREFERRED EMBODIMENT

Figure 3A:
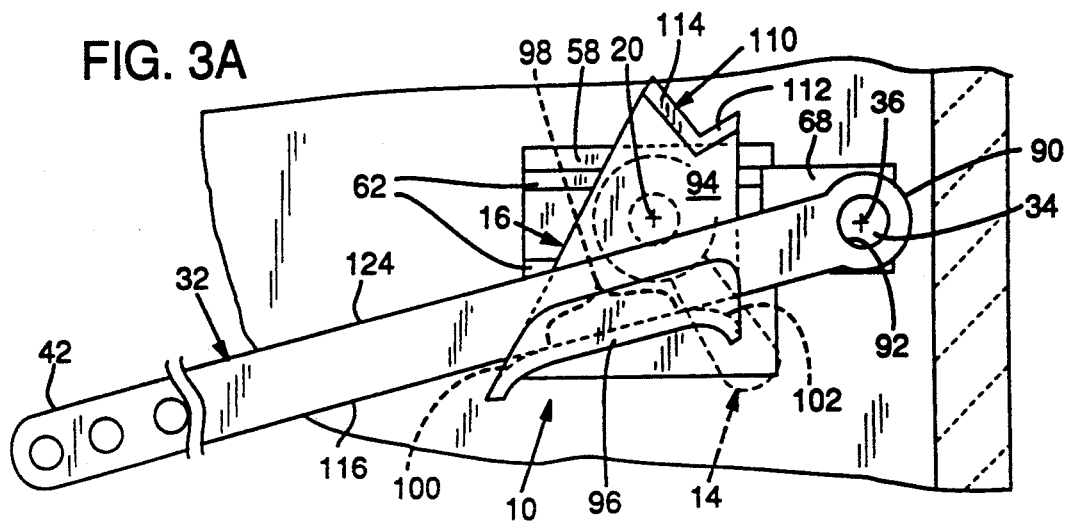
FIG. 3A is a fragmentary sectional view taken along line 3—3 of FIG. 2 showing the apparatus in a resting position.

Referring to the drawings, FIG. 1 illustrates a flush mechanism 10 constructed in accordance with the invention as installed in a toilet flush tank 12. The tank may be equipped with any suitable apparatus (not shown) for controlling the flow of water into the tank following drain of water from the tank to perform a flush operation with the apparatus of the invention. The apparatus includes a manually operable flush handle 14 mounted externally of the tank 12 upon a shaft 16, which extends through a throughbolt 18 (shown in FIG. 2) and is rotatably supported thereby to define a shaft axis 20. A cam 30 is mounted upon the shaft 16 internally of the tank 12 opposite the handle 14 to rotate therewith, as discussed below with reference to FIG. 2.

A flush arm 32 is pivotally mounted within the tank to a pivot pin 34 which defines an arm pivot axis 36 and which is fixed relative to the tank 12 by a mounting bracket 40. The arm 32 includes a distal arm end 42 spaced from the pivot pin 34 and operably connected by suitable means such as a chain 44 to a standard pivotally mounted tank release valve 46 mounted to close a drain 48 in the bottom of the tank. An upward pivoting of the arm 32 lifts the tank release valve 46 to permit water (not shown) to flow from the tank 12. The arm 32 rests upon the cam 30 so that the cam functions as an arm actuator as rotation of the handle 14 raises the arm by a selectable amount as described below with reference to FIGS. 3A-3C.

Referring now to FIG. 2, the throughbolt 18 includes a shoulder portion 50, which engages the outer surface of the tank 12, and a threaded end portion 52, which extends into the tank through a mounting aperture 54 defined by the tank 12. The end portion 52 is threaded into a captured nut 56 retained by the mounting bracket 40 positioned in the interior of the tank 12. The bracket includes a flat mounting plate portion 58. A gasket 60 is positioned between the plate portion 58 and the inner surface of the tank 12.

The bracket 40 further comprises a pair of parallel stiffening ribs 62 projecting inwardly from the inner surface of the plate portion 58 to provide parallel walls between which the nut 56 is captured. The ribs 62 brace a pivot pin support platform 68 spaced inwardly from and parallel to the plate portion 58. The pivot pin 34 is secured to and extends inwardly from the platform 68 in axially parallel relation to the shaft axis 20.

As further shown in FIG. 2, the handle 14 is integrally cast with the shaft 16, which is rotatably received within the throughbolt 18. The shaft 16 terminates in a shaft key 70 having an X-shaped cross section. The cam 30 includes a boss 72 which defines a key aperture 74 configured to receive the shaft key 70 to link the cam 30 to the shaft 16, and thereby to the handle 14. The cam boss 72 and the key 70 each define transverse pin holes 74, 76, respectively, that are registered when the cam is installed, and which closely receive a locking cotter pin 78.

As further shown in FIGS. 2 and 3A, the arm 32 includes a sleeve end 90 defining a sleeve bore 92 sized to receive the pivot pin 34 and to permit the arm 32 to pivot with respect thereto.

FIG. 3A shows the position of the arm 32 and cam 30 when the mechanism 10 is at rest in an inactive position, the cam 30 including a back plate 94 oriented perpendicularly to the shaft axis 20, and the arm 32 extending closely adjacent the plate, as may be seen in FIG. 2. The cam 30 further comprises a lower cam ledge 96 providing arm engaging means integral with the back plate 94 at a lower edge thereof, and provides in its central portion 98 a generally flat engaging surface spaced below and parallel to the shaft axis 20. The central portion 98 slopes downwardly at about a 15° angle to horizontal in the rest or inactive position of the apparatus. The cam ledge 96 includes a first lobe end 100 that curves downwardly away from the central portion 98. The lower cam ledge 96 also includes a second lobe end 102 proximate to the shaft axis 20, and which curves smoothly downward away from the central portion 98.

Figure 3B:
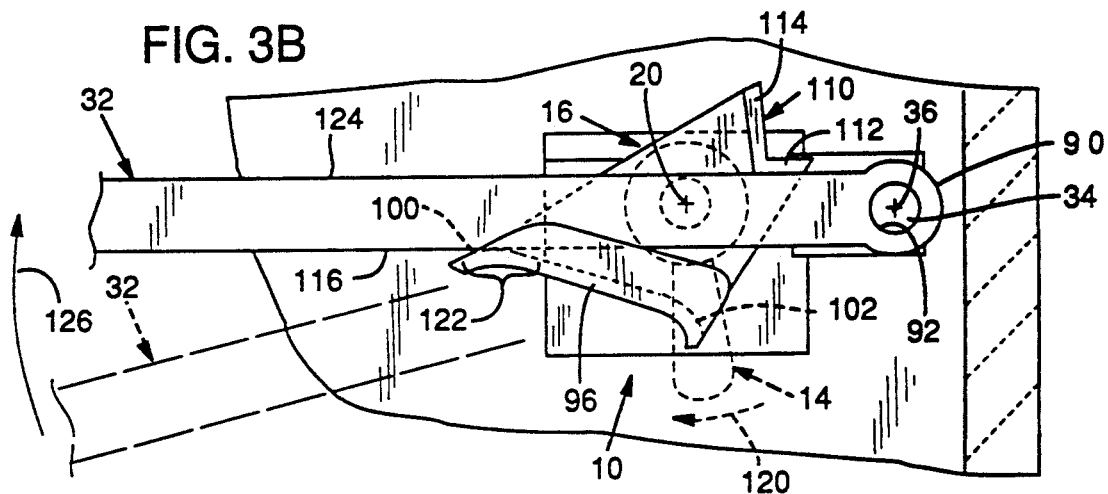
FIG. 3B is a sectional view taken along line 3—3 of FIG. 2 showing the apparatus in a partial flush position.
Figure 3C:
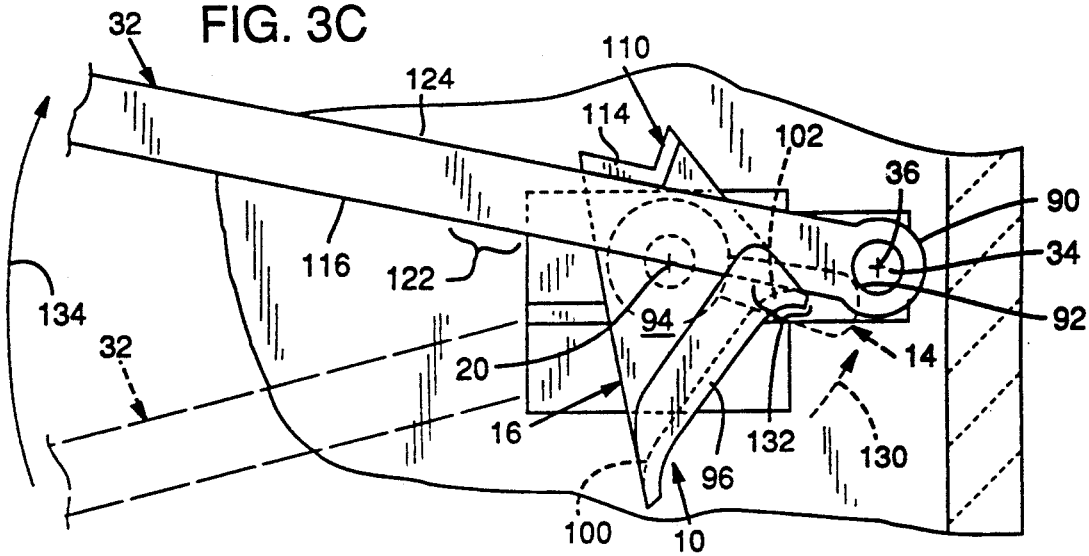
FIG. 3C is a sectional view taken along line 3—3 of FIG. 2 showing the apparatus in a full flush position.

A V-shaped stop element 110 provides cam stop means and projects perpendicularly from the cam plate 94 at the upper portion thereof. The stop element 110 has two legs 112, 114, the function of which will be described below. As seen in FIGS. 3A, 3B and 3C, the arm 32 is received between the stop element 110 and the lower cam ledge 96.

As indicated previously, FIGS. 1 and 3A show the apparatus in its inactive position Wherein the release valve 46 is seated in the tank drain and arm 32 slopes downwardly from the pivot pin 34 and is supported at its lower side 116 on the central portion 98 of the lower cam ledge 96. The chain 44 should have sufficient slack to ensure seating of the valve 46.

FIG. 3B shows the flush mechanism 10 as actuated in an active position to provide a limited flush flow for as long as the handle 14 is retained in the actuated position shown. The handle is moved in a first direction 120 (clockwise in the viewpoint of FIG. 3B) from the resting position shown in FIG. 3A. When the handle 14 is actuated as shown, the cam 30 rotates clockwise and the first lobe end 100 of the lower cam ledge 96 presses upwardly against the lower side 116 of arm 32 in the area indicated at 122, pivoting the arm 32 upward in response until an upper side 124 of the arm 32 engages the first leg 112 of the cam stop element 110. The arm is thereby permitted to pivot upwardly by only a first displacement 126. In this actuated state, the tank release valve 46 is raised a predetermined amount to a partially open position shown at 46' in FIG. 1, such as to permit water to flow from the tank only while the flush handle is maintained in the first direction. This predetermined amount is such that the velocity of the water escaping through the space between the valve 46 and the drain opening 48 will create a low pressure sufficient to overcome the buoyancy of the valve and it will be urged downwardly. When the flush handle 14 is released, the weight of the arm 32 and the valve 46 suspended therefrom causes it to pivot toward its rest position enabling the release valve 46 to close and causing the handle 14 to rotate to its rest position. While the handle 14 may be retained in an open position for as long as desired, generally it will be sufficient to maintain it open only until the water in the toilet bowl starts to swirl and its level beings to drop indicating that the siphon action has commenced.

FIG. 3C shows the flush mechanism 10 actuated in a fully active position for providing a full volume flush to empty the flush tank 12 entirely. The handle 14 is shown actuated in a second (i.e., counterclockwise as shown in FIG. 3C) direction 130 opposite the first direction 120 so that the second lobe portion 102 of the lower cam ledge 96 is raised to engage a second arm portion 132 on the lower side 116 of the arm 32 to pivot the arm upward by a second displacement 134 until the pivoting motion is stopped by the upper side 124 of the arm contacting the second leg of the cam stop 110. This lifts the release valve 46 to the fully open position shown at 46" in FIG. 1, completely opening the tank drain. The buoyancy of the valve will hold it upwardly until the water level drops below the float permitting it to swing to a closed position.

After the arm 32 is moved the full second displacement 134, a release of the handle 14 will permit the mechanism 10 to return to the arrangement shown in FIG. 3A while a full tank flush proceeds.

The handle 14, shaft 16, mounting bracket 40, cam 30, and arm 32 are preferably formed of a durable injection molded plastic to provide smooth operation, long wearing surfaces, low manufacturing cost and simple assembly. It will be noted that exclusive of the cotter pin 78, the apparatus comprises only five parts and may be easily and quickly mounted in place of conventional actuators.

Having illustrated and described the principles of my invention by what is presently a preferred embodiment, it should be apparent to those persons skilled in the art that the illustrated embodiment may be modified without departing from such principles. I claim as my invention, not only the illustrated embodiment, but all such modifications, variations and equivalents thereof as come within the true spirit of the following claims.

I claim:

1. An improved toilet flush apparatus for a tank type toilet having a pivotally mounted buoyant release valve in the bottom thereof, said apparatus comprising:

a flush handle adapted to be rotatably mounted exteriorly of the tank for rotation about a first axis;

a cam adapted to be mounted interiorly of the tank and operably connected to the handle to rotate therewith;

an arm adapted to be pivotally mounted within the tank for pivotal movement about one end of said arm about a second axis parallel to said first axis, means connecting the end of said arm opposite said one end to said valve to raise the same from its closed position upon pivotal movement of said arm, the first axis being located at an intermediate position laterally between the second axis and said opposite arm end;

arm engaging means on said cam for moving the arm by a first displacement when the handle is moved in a first direction to open said valve a predetermined degree, and for moving the arm by a second displacement greater than the first displacement when the handle is moved in a second direction;

the arm engaging means including first and second lobe portions, the first lobe portion positioned to contact the arm at a first arm portion in response to movement of the handle in the first direction, and the second lobe portion positioned to contact the arm at a second arm portion between the first arm portion and the arm pivot axis when the handle is moved in the second direction; and a cam stop means on said cam, said cam stop means having a first portion for engaging said arm and for limiting rotation of the cam in said first direction to a first maximum rotation, such that a flush of limited volume is provided while the handle is moved and held in the first direction at said first maximum rotation, with release of the handle causing immediate cessation of flush flow, and a full volume flush is provided when the handle is moved in the second direction.

2. A dual mode toilet flush apparatus for a toilet having a tank and tank release valve mounted in the drain thereof comprising:

an elongated arm adapted to be pivotally mounted at one end within the tank, with means operably connecting an opposite end of said arm to said release valve so that said valve is elevated from its closed position upon rotation of said arm from a first position;

an arm actuator adapted to be movably mounted within the tank for limited movement between an inactive position and first and second active positions, said arm actuator having means for engaging the arm at a first arm portion upon movement of said actuator in a given direction, such that the arm is moved from the first position thereof by a first displacement amount in response to movement of the actuator to the first active position, and for engaging the arm at a second arm portion between the first arm portion and the pivot axis thereof such that the arm is moved by a second displacement greater than the first displacement upon movement of said actuator means in a second direction to the second active position;

a stop operably connected to the actuator, and having a first portion for engaging said arm and for limiting arm pivoting to the first displacement amount, and having a second portion for engaging said arm and for limiting arm pivoting to the second displacement amount, the stop moving with the actuator to limit arm displacement; and manually operable handle means operably connected to said arm actuator for effecting movement of said actuator arm selectively to engage said first arm portion or said second arm portion.

3. An improved toilet flush apparatus for a tank type toilet having a pivotally mounted buoyant release valve in the bottom thereof, said tank defining a front aperture, the apparatus comprising:

a throughbolt mountable within the aperture, the throughbolt having a shoulder mountable against the exterior of the tank and having an opposed threaded end adapted to extend into the interior of the tank, the throughbolt defining an axial bore;

a manually operable flush handle including an integral shaft rotatably received by the bore of the throughbolt and sized to extend into the tank, the shaft being terminated at a free end by a key;

a mounting bracket comprising a mounting plate defining a clearance hole receiving the threaded end of the throughbolt, the mounting plate being mountable against the interior surface of the tank and including inwardly protruding ribs retaining a threaded nut in registration with the clearance hole, the throughbolt being engaged by the nut to bias the bracket against the interior surface of the tank to rigidly fix it in place, the bracket further including a cylindrical pivot pin integrally attached thereto and oriented on an axis parallel to and spaced apart from the axis of the throughbolt bore;

an elongated arm pivotally mounted to the pivot at a first end and operably connectable at an opposed second end to the release valve; and a cam having a boss portion defining a keyway sized to mate with the shaft key such that the cam rotates with the shaft, the cam further including a cam plate forming a flat surface integral with the boss and oriented perpendicular to the shaft and aligned adjacent to the arm, with a generally flat cam ledge extending inwardly from a lower edge of the plate and being of sufficient width that the arm may rest thereon, the cam plate further including an inwardly projecting stop integrally attached to an upper portion of the plate such that the arm is received between the stop and the cam ledge;

whereby a rotation of the handle in a first direction moves the arm upward by a first displacement to open the valve to a predetermined degree that permits the valve to close immediately on release of the handle; and whereby rotating the handle in a second direction opposite the first direction moves the arm upwardly by a second displacement greater than the first displacement to fully open the valve, providing a full flush that completely empties the tank.

* * * * *